United States Patent
Lam et al.

(10) Patent No.: US 7,224,717 B1
(45) Date of Patent: May 29, 2007

(54) SYSTEM AND METHOD FOR CROSS CORRELATION RECEIVER

(75) Inventors: Lawrence K. Lam, San Jose, CA (US); Michael J. Lovinfosse, Mountain View, CA (US); Bobby L. Ramsey, Elk Grove, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 761 days.

(21) Appl. No.: 10/693,321

(22) Filed: Oct. 24, 2003

Related U.S. Application Data

(60) Provisional application No. 60/426,413, filed on Nov. 15, 2002.

(51) Int. Cl.
*H04B 1/69* (2006.01)
*H04B 7/10* (2006.01)

(52) U.S. Cl. ............ 375/144; 375/347; 375/322; 455/562

(58) Field of Classification Search .......... 375/144, 375/130, 347, 316, 322; 342/22, 27, 98, 342/424, 385; 455/132, 562, 272
See application file for complete search history.

(56) References Cited

U.S. PATENT DOCUMENTS

| | | | |
|---|---|---|---|
| 3,699,450 A | 10/1972 | Rainal | |
| 4,081,679 A | 3/1978 | Cohn | |
| 6,005,903 A | 12/1999 | Mendelovicz | |
| 6,463,295 B1* | 10/2002 | Yun | 455/522 |
| 7,035,661 B1* | 4/2006 | Yun | 455/522 |
| 2002/0135513 A1* | 9/2002 | Paschen et al. | 342/371 |
| 2005/0191978 A1* | 9/2005 | Spencer et al. | 455/132 |

OTHER PUBLICATIONS

Thompson et al., "Interferometry and Synthesis in Radio Astronomy", *Chapter 8: Digital Signal Processing; 8:8: Digital Correlators for Continuum Observations*, Krieger Publishing Company, 1998, p. 236, Malabar, Florida.

* cited by examiner

*Primary Examiner*—Khai Tran
(74) *Attorney, Agent, or Firm*—McDermott, Will & Emery LLP.

(57) ABSTRACT

A system and method for detecting signals. A system includes a first antenna configured to receive at least a first input signal and generate at least a first received signal, and a second antenna configured to receive at least a second input signal and generate at least a second received signal. Additionally, the system includes a receiver system configured to generate at least a first output signal, a second output signal, a third output signal, and a fourth output signal. Moreover, the system includes a correlation system configured to receive at least the third output signal and the fourth output signal and generate at least a correlation signal, and a processing system configured to estimate a cross correlated power level.

26 Claims, 6 Drawing Sheets

SYSTEM AND METHOD FOR CROSS CORRELATION RECEIVER

CROSS-REFERENCES TO RELATED APPLICATIONS

This application claims priority to U.S. Provisional No. 60/426,413 filed Nov. 15, 2002, which is incorporated by reference herein.

BACKGROUND OF THE INVENTION

The present invention relates in general to detecting objects and/or areas. More particularly, the invention provides a method and system for signal correlation. Merely by way of example, the invention is described as it applies to correlating two signals, but it should be recognized that the invention has a broader range of applicability.

In radio astronomy, for example, the measurement of the cross correlation between two signals is required. A measurement configuration usually comprises of two spatially separated antennas pointing in the same direction to receive the microwave energy radiated by a selected radio star. The received microwave energy from the radio star is expected to be much weaker than the microwave energy received from the terrestrial thermal surroundings of the antennas.

There are a number of conventional systems and methods for measuring the cross correlation of signals. For example, a correlation receiver may function as a radiometer. The system may include two bandpass limiters that are located between the outputs of two radio receivers and the inputs to a multiplier. The bandpass limiters reduce the amplitude modulation at the inputs of the multiplier due to the fluctuation in the amplification gain of the radio receivers.

Another conventional method uses a quadrature hybrid to transform two independent thermal signals into two other signals that are coherent with respect to each other. Yet another method uses a 180-degree hybrid to transform two independent thermal signals into other signals to be correlated. Depending on which method is applied, the output of the correlator is proportional to the sum or the difference of power in the two independent thermal signals.

In the conventional systems and methods, the antenna and other microwave components located in front of the correlator contributes a small amount of noise because of the finite temperature of these components. In radio astronomy applications, the noise power contributed by the antenna and microwave components in front of a correlator could be orders of magnitude higher than the external signal received by the antenna. To reduce the contribution of noise from front-end components, radio astronomers usually use spatially separated antennas and low noise radio receivers to make correlation measurements.

For example, a method of measuring both the amplitude and the phase of the cross correlation of two signals uses two multipliers and a quadrature network. The result is a complex cross correlator. But the fluctuation in the amplification gain of the correlative receivers is usually not compensated. As another example, a digital cross correlator can acquire and track spread spectrum communication signals. This type of correlator is designed to correlate a known binary sequence with an unknown signal embedded in noise.

As discussed above, a number of types of correlation receivers have been developed in prior art techniques. When the weak signals to be correlated are themselves sums of plurality of weaker signals, the task to determine the coherence between them can be quite challenging. Conventional correlation receiver usually cannot effectively extract and separate the correlation properties among weak and complex signals.

Hence it is highly desirable to improve cross-correlation techniques.

BRIEF SUMMARY OF THE INVENTION

The present invention relates in general to detecting objects and/or areas. More particularly, the invention provides a method and system for signal correlation. Merely by way of example, the invention is described as it applies to correlating two signals, but it should be recognized that the invention has a broader range of applicability.

According to a specific embodiment of the present invention, a system for detecting signals includes a first antenna configured to receive at least a first input signal and generate at least a first received signal, and a second antenna configured to receive at least a second input signal and generate at least a second received signal. Additionally, the system includes a receiver system configured to receive at least the first received signal and the second received signal and generate at least a first output signal, a second output signal, a third output signal, and a fourth output signal. Moreover, the system includes a correlation system configured to receive at least the third output signal and the fourth output signal and generate at least a correlation signal, and a processing system configured to receive at least the correlation signal, the first output signal and the second output signal and estimate a cross correlated power level. The first output signal is associated with at least amplitude information of the first received signal, the second output signal is associated with at least amplitude information of the second received signal, the third output signal is associated with at least phase information of the first received signal, and the fourth output signal is associated with at least phase information of the second received signal.

According to another embodiment of the present invention, a system for correlating signals includes a receiver system configured to receive at least the first input signal and the second input signal and generate at least a first log-video signal, and a second log-video signal, a first intermediate frequency signal, and a second intermediate frequency signal. Additionally, the system includes a correlation system configured to receive at least the first intermediate frequency signal and the second intermediate frequency signal and generate at least a correlation signal. Moreover, the system includes a processing system configured to receive at least the correlation signal, the first log-video signal and the second log-video signal and estimate a cross correlated power level based on at least information associated with the correlation signal, the first log-video signal and the second log-video signal.

According to yet another embodiment of the present invention, a method for detecting signals includes receiving a first input signal, receiving a second input signal, and generating a first log-video signal, a second log-video signal, a first intermediate frequency signal, and a second intermediate frequency signal. Additionally, the method includes generating an in-phase correlation signal, a quadrature-phase correlation signal, and a normalization signal, and processing at least information associated with the in-phase correlation signal, the quadrature-phase correlation signal, the normalization signal, the first log-video signal, and the second log-video signal. Moreover, the method includes determining a cross correlated power level based on at least information associated with the in-phase correlation signal, the quadrature-phase correlation signal, the normalization signal, the first log-video signal, and the second log-video signal.

Many benefits may be achieved by way of the present invention over conventional techniques. For example, certain embodiments of the present invention provide a method for making radiometric measurements and computing the cross-correlation of two signals over a large input signal dynamic range. Some embodiments of the present invention provide high sensitivity, precision and functionality to perform extraction, separation and characterization of the coherence properties of weak and complex signals. Certain embodiments of the present invention can compute the real and imaginary parts of a complex cross-correlation measurement and a normalization factor, and accumulate the computation results. The cross-correlation between two input signals is a function of the relative time delay between the signals. Some embodiments of the present invention compensate for amplification gain fluctuations in receiver channels. Certain embodiments of the present invention mitigate the effects resulting from offsets in analog-to-digital converters used in a digital cross correlator. These embodiments use a low pass filter with zero responses at predetermined spectral locations to mitigate the effects due to imperfections in analog-to-digital converters. Some embodiments of the present invention perform cross-correlation measurements with simple circuitry for performing integer multiplications involving +1 and powers of 2's. The various components of the cross correlation receiver may be fabricated on a single chip. Certain embodiments of the present invention can provide a cross correlation receiver with more channels at lower costs and higher speed than conventional technologies.

Depending upon the embodiment under consideration, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to detecting objects and/or areas. More particularly, the invention provides a method and system for signal correlation. Merely by way of example, the invention is described as it applies to correlating two signals, but it should be recognized that the invention has a broader range of applicability.

Figure 1:
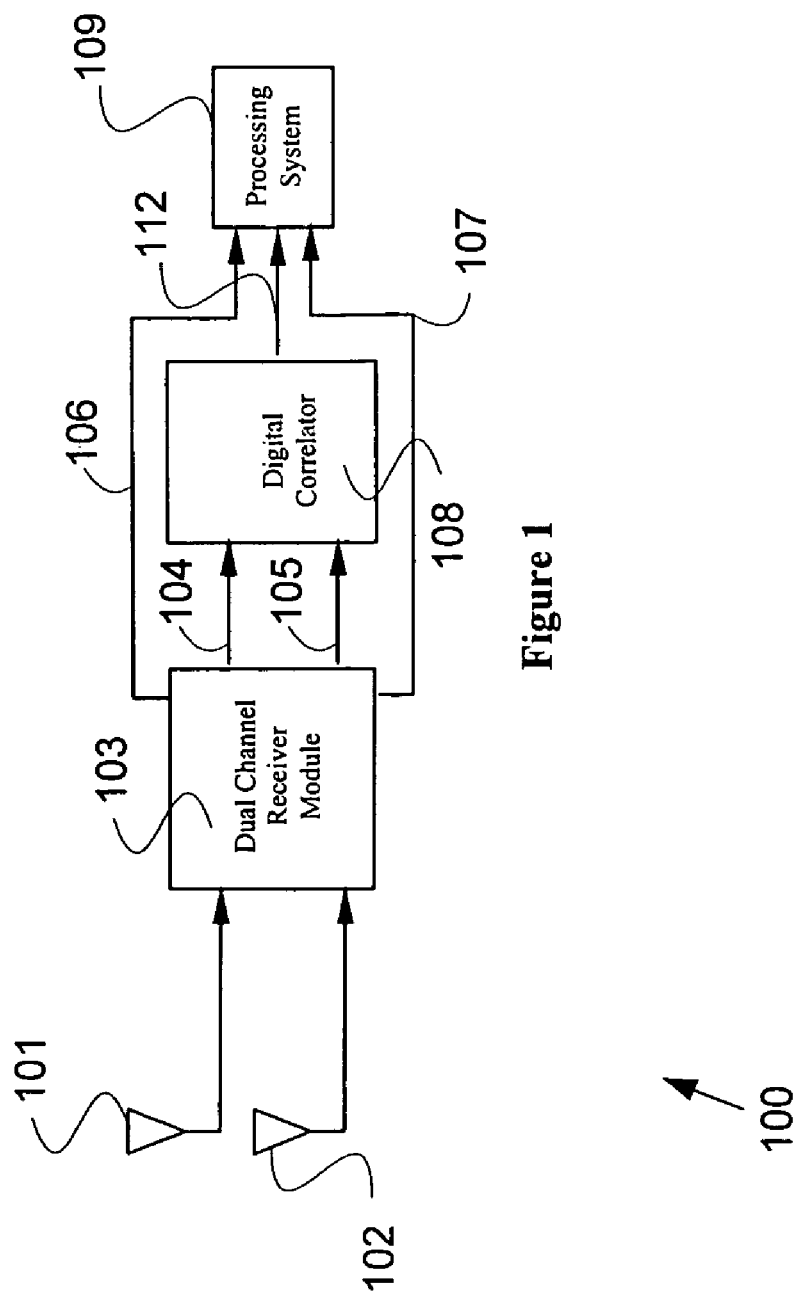
FIG. 1 is a simplified diagram for a cross-correlation receiver according to one embodiment of the present invention.

FIG. 1 is a simplified diagram for a cross-correlation receiver according to one embodiment of the present invention. This diagram is merely an example, which should not unduly limit the scope of the present invention. One of ordinary skill in the art would recognize many variations, alternatives, and modifications. A cross-correlation receiver 100 includes antennas 101 and 102, a dual channel receiver module 103, a digital correlator 108, and a processing system 109. Although the above has been shown using systems 101, 102, 103, 108, and 109, there can be many alternatives, modifications, and variations. For example, some of the systems may be expanded and/or combined. Additional antennas may be added to the cross-correlation receiver 100. Other systems may be inserted to those noted above. Depending upon the embodiment, the specific systems may be replaced. A multiple channel receiver module may replace the dual channel receiver module 103. The multiple channel receiver module can process the received signals from more than two antennas. Further details of these systems are found throughout the present specification and more particularly below.

The two antennas 101 and 102 may be part of a signal collection system, and their outputs are applied to a dual channel receiver module 103. As shown in FIG. 1, the antennas 101 and 102 are separated. The spatial separation usually causes the received signals to have different characteristics. For example, in the case where there is a single point-like source of radiation, the time and phase of the signals arriving at two spatially separated antennas are described by simple parameters, for example, a phase difference of arrival or a time difference of arrival. In the case involving multiple sources of radiation or spatially distributed independent sources of radiation, the instantaneous spectral characteristics of the signals arriving at two spatially separated antennas are also different.

The dual channel receiver module 103 includes two super-heterodyne receiver channels and four outputs. These outputs are, for example, two channels of intermediate frequency (IF) signals 104 and 105 and two channels of detected log-video signals 106 and 107. The IF signals 104 and 105 are usually band-limited and contain phase information of the received signals. Additionally, the log-video signals 106 and 107 contain amplitude information of the received signals. For example, the log-video signals 106 and 107 represent the amplitude information in logarithmic or dB format. The combination of the IF signals 104 and 105 and the log-video signals 106 and 107 provides a large dynamic range to the cross-correlation receiver 100. For example, the dynamic range extends far above and far below the thermal noise level. The log-video signals 106 and 107 contribute to the part of the dynamic range above or close to the thermal noise level. The IF signals 104 and 105 contribute to the part of the dynamic range below or close to the thermal noise level.

As shown in FIG. 1, the IF signals 104 and 105 are connected to the digital cross correlator 108. The detected log-video signals 106 and 107 are connected to the processing system 109. Output 112 of the digital cross correlator 108 is connected to the processing system 109. As shown in FIG. 1, the processing system 109 combines the detected log-video signals 106 and 107 with the output 112 from the digital cross correlator 108 to estimate the cross-correlation between the received signals over a large dynamic range.

The processing system 109 includes an analog to digital converter for converting the detected log-video signals 106 and 107 into digital data for processing. The detected log-video signals 106 and 107 provide information to monitor the variation in the overall amplification gain in the dual channel receiver module 103. The information is used by the processing system 109 to compensate for gain variations and to calibrate the results at the outputs of the digital correlator 108. The algorithms associated with the compensation and calibration are application dependent. In one example, the processing system 109 includes a microprocessor.

Figure 2:
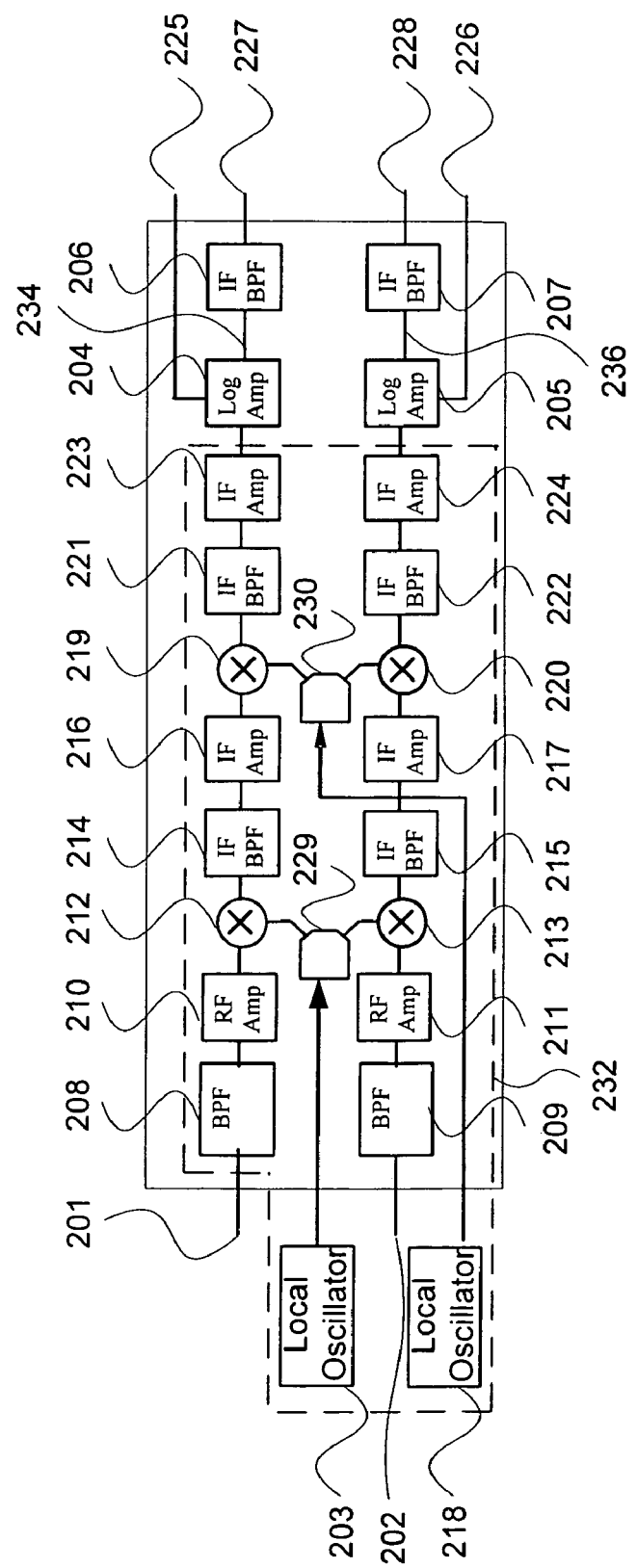
FIG. 2 is a simplified diagram for a dual channel receiver according to one embodiment of the present invention.

FIG. 2 is a simplified diagram for a dual channel receiver according to one embodiment of the present invention. This diagram is merely an example, which should not unduly limit the scope of the present invention. One of ordinary skill in the art would recognize many variations, alternatives, and modifications. The dual channel receiver 103 includes a double down conversion system 232, logarithmic amplifiers 204 and 205, and intermediate frequency (IF) band-pass filters (BPF's) 206 and 207. Although the above has been shown using systems 232, 204, 205, 206, and 207, there can be many alternatives, modifications, and variations. For example, some of the systems may be expanded and/or combined. Other systems may be inserted to those noted above. Depending upon the embodiment, the specific systems may be replaced. Further details of these systems are found throughout the present specification and more particularly below.

As shown in FIG. 2, the double down conversion system 232 includes two double down conversion super-heterodyne receiver channels. For example, the double down conversion system 232 includes radio frequency (RF) band-pass filters (BPF's) 208 and 209, RF amplifiers 210 and 211, mixers 212 and 213, a local oscillator 203, a power divider 229, IF BPF's 214 and 215, IF amplifiers 216 and 217, mixers 219 and 220, a local oscillator 218, a power divider 230, IF BPF's 221 and 222, and IF amplifiers 223 and 224. As discussed above and further emphasized here, FIG. 2 is merely an example, which should not unduly limit the scope of the present invention. One of ordinary skill in the art would recognize many variations, alternatives, and modifications.

The double down conversion system 232 receives the input signals 201 and 202. The input signals 201 and 202 are filtered by the RF BPF's 208 and 209 respectively. The RF BPF's 208 and 209 may include various types of filters and determine the operational frequency band of the dual channel receiver module 103. For example, the frequency bands for the RF BPF's 208 and 209 each range from 2.2 GHz to 2.4 GHz.

The outputs of the RF BPF's 208-209 are connected to the RF amplifiers 210 and 211 respectively. The outputs of the RF amplifiers 210 and 211 are connected to the mixers 212 and 213 respectively. The output of the local oscillator 203 is connected to the power divider 229, which divides the output of the local oscillator 203 to deliver two output signals of equal power level. The outputs of the power divider 229 are connected to the mixers 212 and 213 respectively. The outputs of the RF amplifiers 210 and 211 are mixed with the signals from the local oscillator 203 in the mixers 212 and 213 respectively. Hence both channels 201 and 202 of the dual channel receiver module 103 are tuned by controlling the output frequency of the local oscillator 203.

The outputs of the mixers 212 and 213 are connected to the IF BPF's 214 and 215 respectively. The filters 214 and 215 could be of various types, such as a low-pass filter, an image-reject filter, or a band-stop filter. The response of the IF BPF's 214 and 215 determines the first IF of the dual channel receiver module 103. The outputs of the IF BPF's 214 and 215 are connected to IF amplifier 216 and 217 respectively. The output of the IF amplifiers 216 and 217 are connected to the mixers 219 and 220. The output of the local oscillator 218 is connected to the power divider 230, which divides the output of the local oscillator 218 to deliver two output signals of equal power level. The outputs of the power divider 230 are connected to the mixers 219 and 220 respectively. The outputs of the IF amplifiers 216 and 217 are mixed with the signals from the local oscillator 218 in the mixers 219 and 220 respectively.

The outputs of the mixers 219 and 220 are connected to the IF BPF's 221 and 222, which determine the second IF of the dual channel receiver module 103. The filters 221 and 222 could be of various types, such as a low-pass filter, an image-reject filter, or a band-stop filter. The outputs of the IF BPF's 221 and 222 are connected to the IF amplifiers 223 and 224 respectively.

As shown in FIG. 2, the outputs of the double down conversion system 232 are connected to the logarithmic video amplifiers 204 and 205. The logarithm video amplifiers 204 and 205 can provide a large dynamic range. For example, the outputs of the double down conversion system 232 are generated by the IF amplifiers 223 and 224. The overall amplification gain from the inputs to the RF amplifiers 210 and 211 to the IF outputs 234 and 236 of the logarithmic video amplifiers 204 and 205 is such that under nominal condition, the IF outputs 234 and 236 of the logarithmic video amplifiers 204 and 205 are 3 to 5 dB from saturation.

The IF outputs of the logarithmic video amplifiers 204 and 205 are connected to the band-pass filters 206 and 207. The outputs of the band-pass filters 206 and 207 provide two outputs 227 and 228 of the dual channel receiver module 103. For example, the outputs 227 and 228 are the IF signals 104 and 105 as shown in FIG. 1. The outputs 227 and 228 are fed into the digital correlator 108 for further processing. Usually, the outputs 227 and 228 each contain noise information and signal information. The noise information is related to the noise from the antenna 101 and the noise from the antenna 102. These two noises are usually independent from each other; hence the phase difference between these two noises is random. If the phase difference between two noises is represented by a vector, the integral of the noise vector over an extended period of time has an expectation that is substantially equal to zero. The signal information is related to the signal from the antenna 101 and the signal from the antenna 102. The phase difference between these two signals are usually not random. If the phase difference between two signals is represented by a vector, the integral of the signal vector over time has an expectation that usually increases in magnitude when the integration time period lengthens. As shown in FIG. 2, another two outputs 225 and 226 of the dual channel receiver module 103 are provided by the logarithmic video amplifiers 204 and 205. For example, the outputs 225 and 226 are the detected log-video signals 106 and 107 as shown in FIG. 1.

Figure 3:
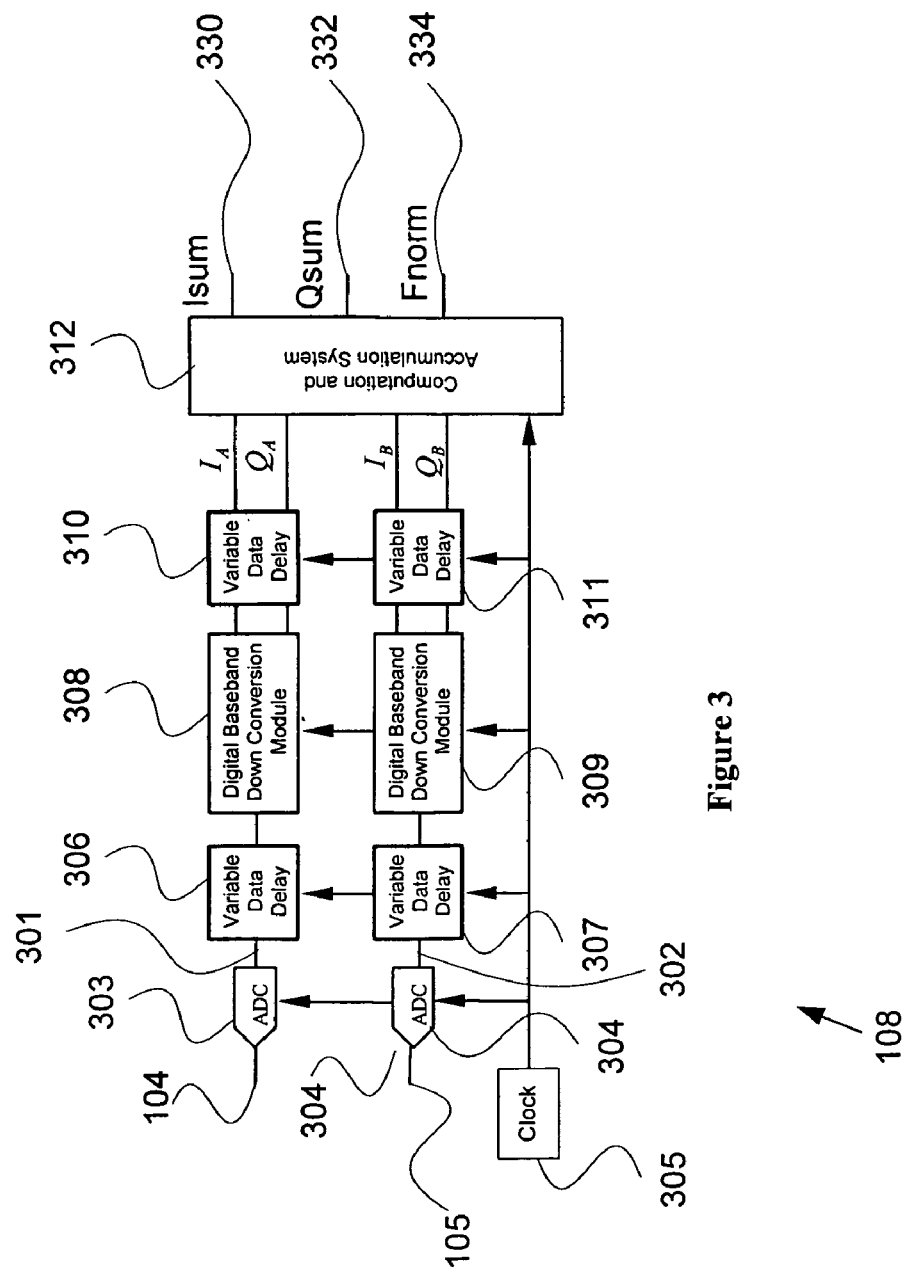
FIG. 3 is a simplified diagram for a digital correlator according to one embodiment of the present invention.

FIG. 3 is a simplified diagram for a digital correlator according to one embodiment of the present invention. This diagram is merely an example, which should not unduly limit the scope of the present invention. One of ordinary skill in the art would recognize many variations, alternatives, and modifications. The digital correlator 108 includes analog-to-digital converters 303 and 304, a clock 305, variable data delay systems 306 and 307, digital baseband down conversion modules 308 and 309, variable data delay systems 310 and 311, and a computation and accumulations system 312.

Although the above has been shown using systems 303, 304, 305, 306, 307, 308, 309, 310, and 311, there can be many alternatives, modifications, and variations. For example, some of the systems may be expanded and/or combined. Other systems may be inserted to those noted above. Depending upon the embodiment, the specific systems may be replaced. For example, the variable data delay systems 306 and 307 or 310 and 311 may be removed from the digital correlator 108. Further details of these systems are found throughout the present specification and more particularly below.

The digital correlator 108 is a component of the cross-correlation receiver 100. The cross-correlation receiver 100 computes the complex degree of correlation concerning the two input signals from the antenna 101 and 102. According to one embodiment of the present invention, the computation of the complex degree of correlation is performed by the digital cross correlator 108 and the processing system 109.

For two digital sequences of complex values, the complex degree of coherence may be defined as:

$$\Gamma(k) = \frac{\langle x_{n+k} y_n^* \rangle}{\sqrt{\langle x_n x_n^* \rangle \langle y_n y_n^* \rangle}} \quad \text{(Equation 1)}$$

where $\langle x_n x_n^* \rangle$ and $\langle y_n y_n^* \rangle$ denote the expectations of the power levels associated with the sequences of complex values $\{x_n\}$ and $\{y_n\}$, and $\langle x_{n+k} y_n^* \rangle$ denotes the expectation of the cross correlation between the two sequences of complex values $\{x_1, x_2, x_3 \ldots, x_n, \ldots x_{n+k}, \ldots\}$ and $\{y_1, y_2, y_3 \ldots, y_n, \ldots y_{n+k}, \ldots\}$ with a relative delay between the sequences specified by an index parameter k. $\langle x_{n+k} y_n^* \rangle$ also denotes a cross correlation function as a function of the parameter k.

As shown in FIG. 3, the IF signals 104 and 105 are received from the dual channel receiver module 103, and are sent into the analog-to-digital converters (ADC's) 303 and 304. Each of the IF signals 104 and 105 is an analog representation of the signals received by the antennas 101 and 102. The IF signals 301 and 302 are digitized in synchronization with the sampling signal generated by the clock 305. The ADC's 303 and 304 generate digitized signals 301 and 302 respectively. In one embodiment, the frequency of the sampling signal generated by the clock 305 equals four times the frequency of the IF signals 104 and 105. For example, the frequency of the IF signals 104 and 105 is centered at 15 MHz. The IF signals 104 and 105 are digitized at a sampling rate equal to four times the IF frequency or 60 MHz. In another embodiment, the sampling signal of the clock 305 is set at another frequency.

The digitized signals 301 and 302 are delayed by the variable data delay systems 306 and 307. The variable data delay systems 306 and 307 each comprise, for example, a series of data shift registers. The effective units of delay provided by the data shift registers are programmable to be, for example, an integer with a range from one to a predetermined integer, K. A single unit of delay in the variable data delay systems 306 and 307 can be substantially equal to a single sampling clock period of the ADC's 303 and 304. The variable data delay systems 306 and 307 can delay the digital data streams 301 and 302 by a small but adjustable amount of time respectively, before the data streams reach the inputs of the digital baseband down conversion modules 308 and 309.

After the digital signals 301 and 302 are delayed by the variable data delay systems 306 and 307, the signals are down converted by the digital baseband down conversion modules 308 and 309. The outputs of the down conversion modules 308 and 309 are connected to the variable data delay systems 310 and 311. The variable data delay systems 310 and 311 each include a series of data shift registers. The effective units of delay of the data shift registers are programmable to be an integer with a range from one to a predetermined number, M. The unit of delay in the variable data delay systems 310 and 311 can be substantially equal to, for example, a pre-determined integer multiple of a sampling clock period of the ADC's 303 and 304.

As shown in FIG. 3, the data rate at the outputs of the variable data delay systems 306 and 307 is usually higher than that at the inputs of the variable data delay systems 310 and 311 respectively. The variable data delay systems 306 and 307 provide smaller amounts of delays that are adjustable in smaller increments to higher data-rate streams. The variable data delay systems 310 and 311 provide larger amounts of delays that are adjustable in larger increments to lower data-rate streams at the outputs of the down conversion modules 308 and 309. In other words, the variable data delays 306 and 307 provide finer adjustments and the variable data delays 310 and 311 provide coarser adjustments.

The outputs of the variable data delay systems 310 and 311 are represented by $I_{A,n}$, $Q_{A,n}$ and $I_{B,n}$, $Q_{B,n}$ respectively, which denote the $n^{th}$ set of data to be cross correlated. The $n^{th}$ set of cross correlation result is, for example:

$$I_{c,n} = I_{A,n} I_{B,n} + Q_{A,n} Q_{B,n} \quad \text{(Equation 2)}$$

$$Q_{c,n} = I_{B,n} Q_{A,n} - I_{A,n} Q_{B,n} \quad \text{(Equation 3)}$$

$$F_{c,n} = (I_{A,n})^2 + (Q_{A,n})^2 + (I_{B,n})^2 + (Q_{B,n})^2 \quad \text{(Equation 4)}$$

where $I_{c,n}$ and $Q_{c,n}$ respectively denote the real and imaginary parts of the $n^{th}$ complex cross correlation, and $F_{c,n}$ denotes the normalization constant associated with the $n^{th}$ cross correlation.

As shown in FIG. 3, the outputs of the variable data delay systems 310 and 311 are connected to the computation and accumulation system 312. For example, the computation and accumulation system 312 is a digital cross-correlation computation and accumulation circuit. The system computes a set of complex cross correlation results $I_{c,n}$, $Q_{c,n}$ and $F_{c,n}$ and provides outputs 330, 332 and 334 for $I_{sum}$, $Q_{sum}$, and $F_{norm}$ respectively. The system combines up to N sets of complex cross correlation results according to:

$$I_{sum} = \sum_{n=1}^{N} I_{c,n} \quad \text{(Equation 5)}$$

$$Q_{sum} = \sum_{n=1}^{N} Q_{c,n} \quad \text{(Equation 6)}$$

$$F_{norm} = \sum_{n=1}^{N} F_{c,n} \quad \text{(Equation 7)}$$

where $I_{sum}$, $Q_{sum}$ and $F_{norm}$ denote the outputs of the computation and accumulation system 312. $I_{sum}$ is the in-phase correlation signal, $Q_{sum}$ is the quadrature-phase correlation signal, and $F_{norm}$ is the normalization factor. As shown in FIG. 1, the outputs 330, 332 and 334 for $I_{Sum}$, $Q_{Sum}$, and $F_{norm}$ forms the output 112. These results are provided to the processing system 109 to compute a normalized complex cross-correlation coefficient, for example:

$$\Gamma = \frac{I_{sum} + jQ_{sum}}{\sqrt{F_{norm}}} \quad \text{(Equation 8)}$$

The processing system 109 may be programmed to combine larger number of sets of outputs from the computation and accumulation system 312 to achieve higher integration gains. In addition, the processing system 109 may be programmed to adjust the delays of the variable data delay systems 306, 307, 310 and 311 to compute a normalized complex cross-correlation function as a function of relative delay. In one embodiment of the present invention, when $\Gamma$ is close to 1, most of the signal power received by the antenna 101 and 102 are related to the signal source to be detected, not to the thermal noise. When $\Gamma$ is equal to 0.1, only about 10% of the signal power received by the antenna 101 and 102 are related to the signal source to be detected. The processing system 109 may be programmed to combine the two channels of detected log-video signals 106 and 107 from the outputs of the dual channel receiver module 103, and the three outputs 330, 332 and 334 from the digital correlator 108 to compute $$P = C_1(V_{log-video1} + V_{log-video2}) + C_2 \log\left\{\frac{I_{sum} + jQ_{sum}}{\sqrt{F_{norm}}}\right\} + C_3 \quad \text{(Equation 9)}$$

where P denotes a power level that is indicative of the amount of signal powers that are correlated between the signals received by antennas 101 and 102, $C_1$, $C_2$, and $C_3$, denotes a set of calibration constants that are determined experimentally by a least squares fit method, and ($V_{log-video1}+V_{log-video2}$) denotes the sum of the detected log-video signals 106 and 107.

Figure 4:
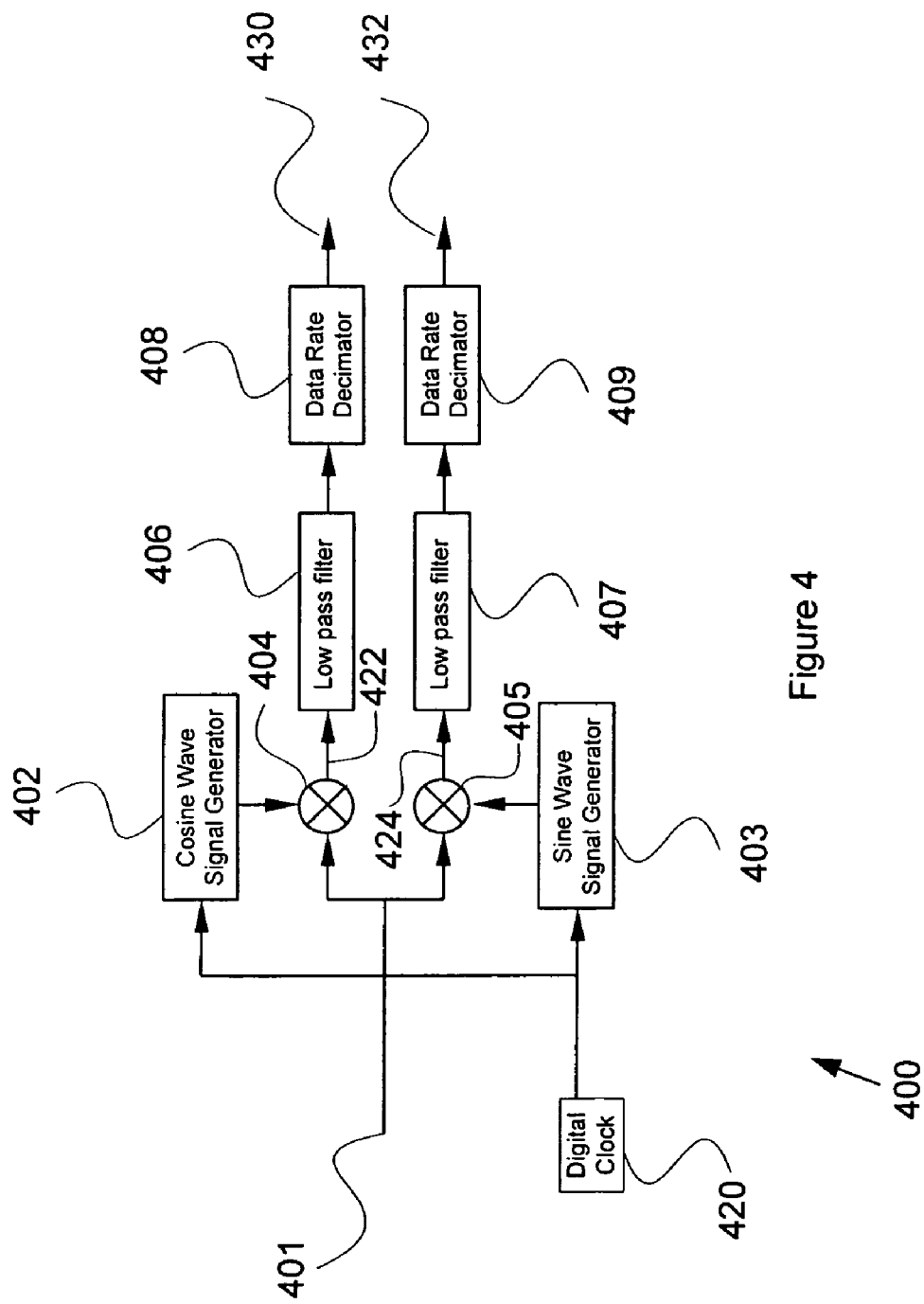
FIG. 4 is a simplified functional block diagram for a digital baseband down conversion module of the cross-correlation receiver according to one embodiment of the present invention.

FIG. 4 is a simplified functional block diagram for a digital baseband down conversion module of the cross-correlation receiver according to one embodiment of the present invention. This diagram is merely an example, which should not unduly limit the scope of the present invention. One of ordinary skill in the art would recognize many variations, alternatives, and modifications. The digital baseband down conversion module 400 includes the following functional components: a cosine wave signal generator 402, a sine wave signal generator 403, an in-phase multiplier 404, a quadrature-phase multiplier 405, low-pass filters (LPF's) 406 and 407, data rate decimators 408 and 409, and a digital clock 420. Although the above has been shown using functional components 402, 403, 404, 405, 406, 407, 408, 409 and 420, there can be many alternatives, modifications, and variations. For example, some of the functional components may be expanded and/or combined. Other functional components may be inserted to those noted above. Depending upon the embodiment, the specific functional component may be replaced. Further details of these functional components are found throughout the present specification and more particularly below.

As shown in FIG. 4, the digital representation of an IF signal 401 is denoted by $\{x_1, x_2, x_3, \ldots x_n, \ldots\}$. For example, the IF signal 401 is the output of the variable data delay system 306 or 307. The output of the cosine wave signal generator 402 is digitized with the sampling signal generated by the digital clock 420 and is denoted by $\{1, 0, -1, 0, \ldots\}$. For example, the sampling signal of the digital clock 420 has the same frequency as the sampling signal of the clock signal 305. Additionally, the output of the sine wave signal generator 403 is digitized with the sampling signal generated by the digital clock 420 and denoted by $\{0, 1, 0, -1, 0, \ldots\}$. For example, the sampling signal of the digital clock 420 has a frequency of 60 MHz. The in-phase multiplier 404 multiplies the digitized signal 401 and the output of the cosine wave signal generator 402, and generates an output signal 422 $\{x_1, 0, -x_3, 0, x_5, 0, -x_7, 0, x_9, 0, -x_{11}, 0, \ldots x_n, \ldots\}$. The quadrature-phase multiplier 405 multiplies the digitized signal 401 and the output of the sine wave signal generator 403, and generate an output signal 424 $\{0, x_2, 0, -x_4, 0, x_6, 0, -x_8, 0, x_{10}, 0, -x_{12}, \ldots x_n, \ldots\}$.

The output signals 422 and 424 are sent to the LPF's 406 and 407 respectively. In one embodiment, a 10-tap LPF with the tap coefficients of $\{1, 1, 2, 4, 4, 4, 4, 2, 1, 1\}$ is used to implement each of the LPF's 406 and 407, which is designed to suppress the high frequency harmonics at the outputs of the multipliers 404 and 405 respectively. The coefficients of this 10-tap filter are equal to powers of 2's and these coefficients are designed to simplify circuit implementation. The first set of data points at the output 430 of the I-channel LPF 406 equals $x_1-2*x_3+4*x_5-4*x_7+x_9$, which is the dot-product of the filter coefficients and the output signal 422. In general, the $n^{th}$ set of data points at the output 422 of the I-channel LPF 406 is denoted by $x_n-2*x_{n+2}+4*x_{n+4}-4*x_{n+6}+x_{n+8}$. Similarly, the first set of data points at the output 432 of Q-channel LPF 407 is equal to $x_2-4*x_4+4*x_6-2*x_8+x_{10}$. In general, the $n^{th}$ set of data points at the output 432 of the Q-channel LPF 407 is denoted by $x_{n+1}-4*x_{n+3}+4*x_{n+5}-2*x_{n+7}+x_{n+9}$.

Figure 5:
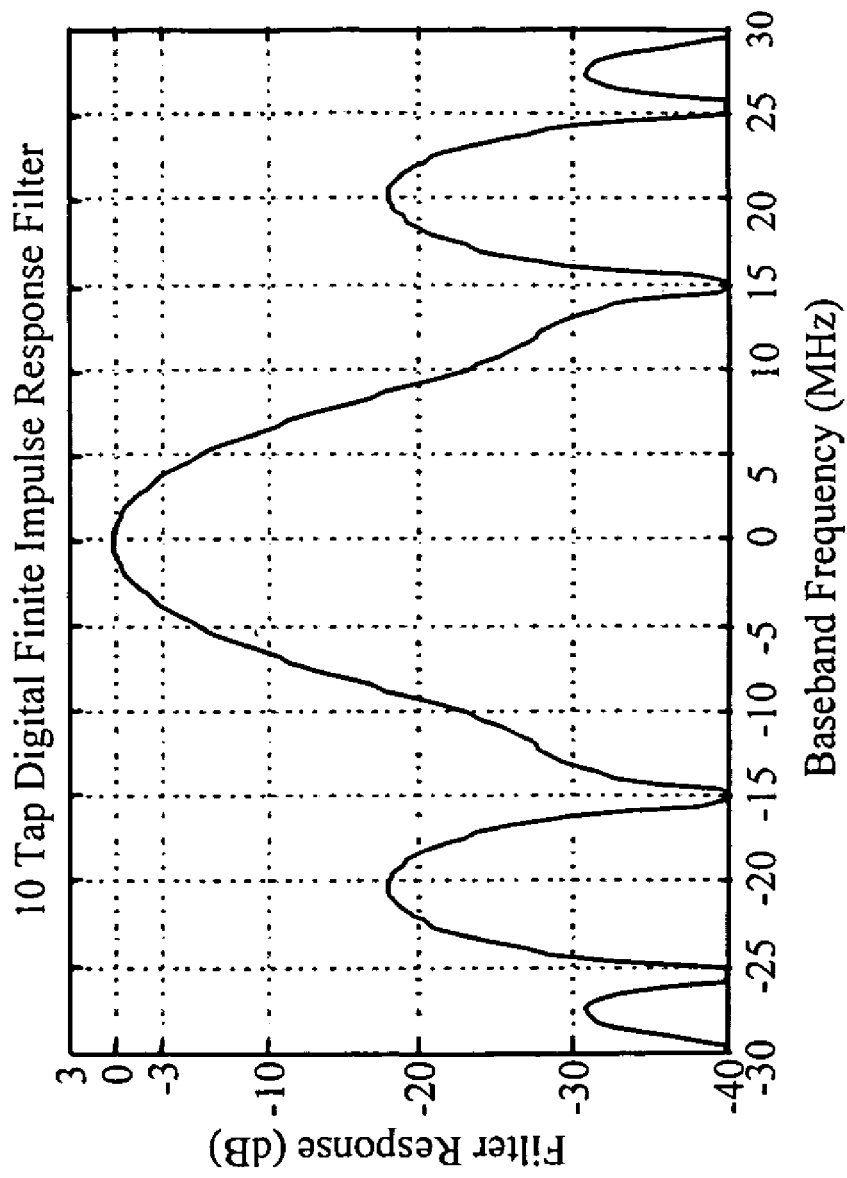
FIG. 5 is a simplified diagram for a 10-tap LPF response of the cross-correlation receiver according to one embodiment of the present invention.

FIG. 5 is a simplified diagram for a 10-tap LPF response of the cross-correlation receiver according to one embodiment of the present invention. This diagram is merely an example, which should not unduly limit the scope of the present invention. One of ordinary skill in the art would recognize many variations, alternatives, and modifications. Imperfections in the ADC's 303 and 304 may induce spurious signals at harmonic frequencies of the sampling clock frequency and these spurious harmonics may appear as sub-harmonics in the digitized outputs of the ADC's 303 and 304 due to spectrum alias effect. For example, if the sampling clock frequency of the digital clock 420 is 60 MHz, then spurious sub-harmonic frequencies at ±15 MHz and ±30 MHz may appear at the outputs of the multipliers 404 and 405. The imperfections of the ADC's 303 and 304 may include input DC offsets, non-linear amplifications, periodic sampling clock jitters and signal quantization errors. The 10-tap LPF response has zeros located at, for example, ±15 MHz and ±30 MHz. This makes the filter suitable for suppressing harmonics that may be generated due to imperfections in the ADC's 303 and 304. To implement a correlation receiver with the highest sensitivity, it is important that the LPF's 406 and 407 be designed to suppress potential spurious signals.

As shown in FIG. 4, the data rate decimators 408 and 409 are used to reduce the data rate of the outputs of the LPF's 406 and 407 respectively. For example, the decimators 408 and 409 can reduce the data rates by a factor of four, eight or twelve. The first set of data points at the outputs of the data rate decimators 408 and 409 are equal to the first set of data points at the outputs of the LPF's 406 and 407 respectively, but the second set of data points at the outputs of the data rate decimators 408 and 409 are equal to the $13^{th}$ set of data points at the outputs of the LPF's 406 and 407 respectively. Specifically, the second data point at the output of data rate decimator 408 is equal to $x_{13}-2*x_{15}+4*x_{17}-4*x_{19}+x_{21}$, and the second data point at the output of the data rate decimator 409 is equal to $x_{14}-4*x_{16}+4*x_{18}-2*x_{20}+x_{22}$.

In one embodiment of the present invention, the outputs of the data rate decimators 408 and 409 are also the outputs of the digital baseband down conversion modules 308 or 309 as shown in FIG. 3. The data rate at the outputs of the digital data down conversion modules 308 and 309 is lower than the data rate at the inputs, so the subsequent circuits may operate at slower speeds with lower energy consumption.

Figure 6:
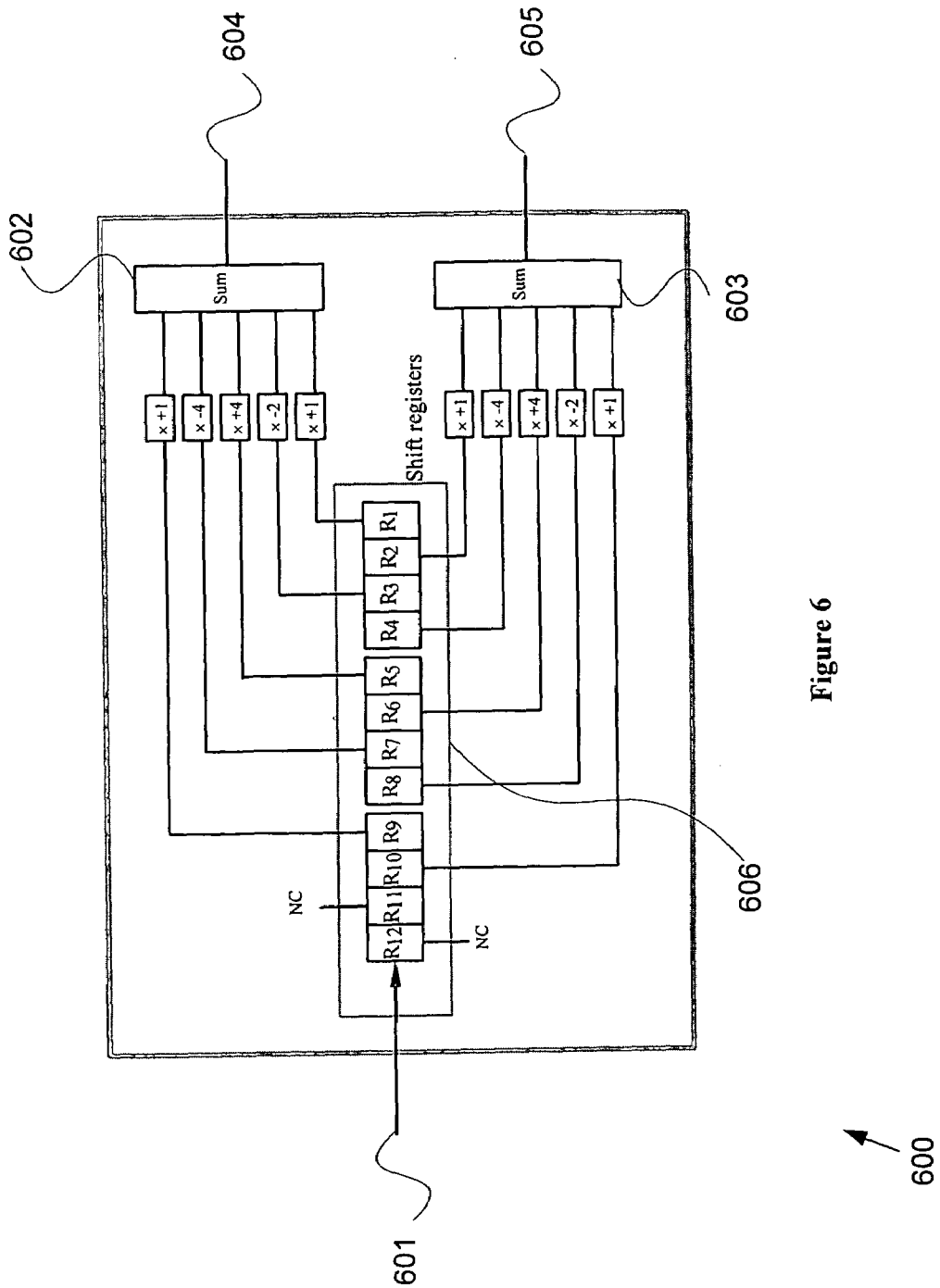
FIG. 6 is a simplified system diagram for a digital baseband down conversion module according to one embodiment of the present invention.

An exemplary embodiment of a digital baseband down conversion module 308-309 is described using a functional block diagram shown in FIG. 4, an exemplary filter response shown in FIG. 5, and an exemplary implementation block diagram shown in FIG. 6.

FIG. 6 is a simplified system diagram for a digital baseband down conversion module according to one embodiment of the present invention. This diagram is merely an example, which should not unduly limit the scope of the present invention. One of ordinary skill in the art would recognize many variations, alternatives, and modifications. In one example, the digital baseband down conversion module 600 is a system implementation of the baseband down conversion module 400. The baseband down conversion module 600 includes at least data shift registers 606, and summing circuits 602 and 603. Although the above has been shown using at least systems 606, 602 and 603, there can be many alternatives, modifications, and variations. For example, some of the systems may be expanded and/or combined. Other systems may be inserted to those noted above. Depending upon the embodiment, the specific systems may be replaced. Further details of these systems are found throughout the present specification and more particularly below.

As shown in FIG. 6, data shift registers 606 includes data shift register $R_1$ through $R_{12}$. A sequence of data 601 is serially shifted into the shift registers 606. The outputs of the shift registers 606 are multiplied by two sets of signed integers in power of 2's and parallel loaded into two summing circuits 602 and 603. The output 604 of the summing circuit 602 equals $R_1-2*R_3+4*R_5-4*R_7+R_9$, and the output 605 of the summing circuit 603 equals $R_2-4*R_4+4*R_6-2*R_8+R_{10}$. The outputs 604 and 605 of the summing circuits 602 and 603 respectively are the outputs of the baseband down conversion module 600. In this embodiment, the data rate is reduced by a factor of 12. As discussed above and further emphasized here, one of ordinary skill in the art would recognize many variations, alternatives, and modifications. For example, the data shift register 606 may include more or less than twelve shift registers. As another example, the data rate is reduced by integral multiples of the factor 4.

It should be noted that the multiplication of a binary number by a number which is a power of two is usually the same as shifting the bit pattern of the binary representation by an integer number of bits. It should be noted that in 2's complement binary representation, the multiplication of a binary number by $-1$ is the same as negating the bits of the binary number and adding one to the result. Therefore the embodiment shown in FIG. 6 can be implemented using relatively simple logical circuits.

In one embodiment of the present invention, the output 604 corresponds to the output 430, and the output 605 corresponds to the output 432 as shown in FIG. 4. The data used to generate the first set of data points at the outputs 430 and 432 are the first 12 data points of the input signal 401, $\{x_1, x_2, x_3, x_4, x_5, x_6, x_7, x_8, x_9, x_{10}, x_{11}, x_{12}\}$. This sequence of data is shifted into the data registers 606. Then, the outputs of the data registers 606 are multiplied by two sets of signed integers in power of 2's and parallel loaded into the summing circuits 602 and 603. After the data are summed, the outputs of the summing circuits 604 and 605 are the data corresponding to the first set of data points at the outputs 430 and 432 of the data rate decimator 408 and 409. The first set of data points at the output 604 equals $x_1-2*x_3+4*x_5-4*x_7+x_9$, and the first set of data points at the output 605 equals $x_2-4*x_4+4*x_6-2*x_8+x_{10}$.

The data used to generate the second set of data points at the outputs 430 and 432 of the data rate decimator 408 and 409 are the next 12 data points of the input signal 401, which is the sequence $\{x_{13}, x_{14}, x_{15}, x_{16}, x_{17}, x_{18}, x_{19}, x_{20}, x_{21}, x_{22}, x_{23}, x_{24}\}$. This sequence of data is shifted into the data registers 606. The outputs 430 and 432 from the data registers 606 are multiplied by the same two sets of signed integers in power of 2's and parallel loaded into the summing circuits 602 and 603. The outputs of the summing circuits 602 and 603 are the data corresponding to the second set of data points at the outputs 430 and 432 of data rate decimators 408 and 409. In general, the $n^{th}$ set of data points at the output 604 equals $x_n-2*x_{n+2}+4*x_{n+4}-4*x_{n+6}+x_{n+8}$. Similarly, the $n^{th}$ set of data points at the output 605 equals $x_{n+1}-4*x_{n+3}+4*x_{n+5}-2*x_{n+7}+x_{n+9}$.

FIG. 6 is an embodiment of a circuit that performs the functions of baseband down conversion, low pass filtering, and data rate decimation as shown in FIG. 4. The circuit is designed for high data rate operation and low power consumption, and is particularly suitable for real time signal processing when the signal to be processed is a wide bandwidth signal. For example, the circuit in FIG. 6 can perform the real time processing as described in U.S. Pat. No. 5,748,507, which is incorporated by reference herein for all purposes.

The dual channel cross correlation receiver as embodied in FIG. 1 can be calibrated. For example, during calibration, a signal with a known strength is applied to the antenna 101 and another signal with another known strength is applied to the antenna 102. The signal for the antenna 101 and the signal for the antenna 102 are correlated with known correlation angle and have known power levels; hence the cross correlated power level is defined based on at least the known power levels. In response to the applied signals, a normalized correlated power level can be computed as described by Equation 9, based on the normalized complex cross-correlation coefficient Γ as described in Equation 8, and the two detected log-video signals 106 and 107 as shown in FIG. 1. The calibration establishes corresponding relationships between different sets of normalized complex cross-correlation coefficient and two log-video signals and different cross correlated power levels. These corresponding relationships can be compiled into a look-up table or fitted into a function. The fitting process may use the least squares method. The function has three inputs, i.e., the obtained normalized complex cross-correlation coefficient and two log-video signals. The function has one output, i.e., the cross correlated power level. In actual use, the dual channel cross correlation receiver may obtain the normalized complex cross-correlation coefficient and two log-video signals, and then determine the cross correlated power level with the lookup table or the fitted function.

The present invention has various advantages. For example, certain embodiments of the present invention provide a method for making radiometric measurements and computing the cross-correlation of two signals over a large input signal dynamic range. Some embodiments of the present invention provide high sensitivity, precision and functionality to perform extraction, separation and characterization of the coherence properties of weak and complex signals. Certain embodiments of the present invention can compute the real and imaginary parts of a complex cross-correlation measurement and a normalization factor, and accumulate the computation results. The cross-correlation between two input signals is a function of the relative time delay between the signals. Some embodiments of the present invention compensate for amplification gain fluctuations in receiver channels. Certain embodiments of the present invention mitigate the effects resulting from offsets in analog-to-digital converters used in a digital cross correlator. These embodiments use a low pass filter with zero responses at pre-determined spectral locations to mitigate the effects due to imperfections in analog-to-digital converters. Some embodiments of the present invention perform cross-correlation measurements with simple circuitry for performing integer multiplications involving ±1 and powers of 2's. The various components of the cross correlation receiver may be fabricated on a single chip. Certain embodiments of the present invention can provide a cross correlation receiver with more channels at lower costs and higher speed than conventional technologies.

The present invention has various applications. Certain embodiments of the present invention track a moving object whose signal strength changes with time or environment. Some embodiments of the present invention detect multiple objects, some of which have strong signal strength while others of which have weak signal strength. Certain embodiments of the present invention can be used to track mobile phones. Some embodiments of the present invention may be used to detect a target for a rescue operation, for example, in sea or in forest.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for detecting signals, the system comprising:
   a first antenna configured to receive at least a first input signal and generate at least a first received signal;
   a second antenna configured to receive at least a second input signal and generate at least a second received signal;
   a receiver system configured to receive at least the first received signal and the second received signal and generate at least a first output signal, a second output signal, a third output signal, and a fourth output signal;
   a correlation system configured to receive at least the third output signal and the fourth output signal and generate at least a correlation signal;
   a processing system configured to receive at least the correlation signal, the first output signal and the second output signal and estimate a cross correlated power level;
   wherein
      the first output signal is associated with at least amplitude information of the first received signal;
      the second output signal is associated with at least amplitude information of the second received signal;
      the third output signal is associated with at least phase information of the first received signal;
      the fourth output signal is associated with at least phase information of the second received signal.

2. The system of claim 1 wherein the correlation system comprises
   a first variable delay system configured to receive the third output signal;
   a first down conversion system connected to the first variable delay system and configured to down convert a frequency of the third output signal;
   a second variable delay system configured to receive the third down-converted output signal.

3. The system of claim 2 wherein the correlation system further comprises:
   a third variable delay system configured to receive the fourth output signal;
   a second down conversion system connected to the third variable delay system and configured to down convert a frequency of the fourth output signal;
   a fourth variable delay system configured to receive the fourth down-converted output signal.

4. The system of claim 3 wherein the first down conversion system comprises:
   a plurality of shift registers configured to receive at least a first datum, a second datum and a third datum respectively;
   a first summing system configured to receive at least a first datum multiplied by a first constant;
   a second summing system configured to receive at least a second datum multiplied by a second constant;
   wherein the third datum is free from transmission to the first summing system and the second summing system.

5. The system of claim 4 wherein the plurality of shift registers is further configured to receive at least a fourth datum and a fifth datum respectively, the fourth datum multiplied by a third constant and transmitted to the first summing system, the fifth datum multiplied by a fourth constant and transmitted to the second summing system.

6. The system of claim 5 wherein the first constant, the second constant, the third constant, and the fourth constant are each integers in power of two's.

7. The system of claim 5 wherein one of the first constant and the third constant is positive, the other of the first constant and the third constant is negative, one of the second constant and the fourth constant is positive, and the other of the second constant and the fourth constant is negative.

8. The system of claim 4 wherein the processing system is configured to estimate a cross correlation coefficient based on at least information associated with the correlation signal, and estimate a cross correlated power level based on at least information associated with the cross correlation coefficient, the first output signal, and the second output signal.

9. The system of claim 8 wherein the at least a correlation signal comprises an in-phase correlation signal, a quadrature-phase correlation signal, and a normalization signal.

10. The system of claim 1 wherein the first output signal is a first log-video signal, and the second output signal is a second log-video signal.

11. The system of claim 10 wherein the third output signal is a first intermediate frequency signal, and the fourth output signal is a second intermediate frequency signal.

12. A system for correlating signals, the system comprising:
   a receiver system configured to receive at least the first input signal and the second input signal and generate at least a first log-video signal, and a second log-video signal, a first intermediate frequency signal, and a second intermediate frequency signal;
   a correlation system configured to receive at least the first intermediate frequency signal and the second intermediate frequency signal and generate at least a correlation signal;
   a processing system configured to receive at least the correlation signal, the first log-video signal and the second log-video signal and estimate a cross correlated power level based on at least information associated with the correlation signal, the first log-video signal and the second log-video signal.

13. The system of claim 12 wherein the first log-video signal is associated with at least amplitude information of the first input signal, the second log-video signal is associated with at least amplitude information of the second input signal, the first intermediate frequency signal is associated with at least phase information of the first input signal, and the second intermediate frequency signal is associated with at least phase information of the second input signal.

14. The system of claim 12 wherein the correlation system comprises
a first variable delay system configured to receive the first intermediate frequency signal;
a first down conversion system connected to the first variable delay system and configured to down convert a frequency of the first intermediate frequency signal;
a second variable delay system configured to receive the first down-converted intermediate frequency signal.

15. The system of claim 14 wherein the correlation system further comprises:
a third variable delay system configured to receive the second intermediate frequency signal;
a second down conversion system connected to the third variable delay system and configured to down convert a frequency of the second intermediate frequency signal;
a fourth variable delay system configured to receive the second intermediate frequency signal.

16. The system of claim 12 wherein the first down conversion system comprises:
a plurality of shift registers configured to receive at least a first datum, a second datum and a third datum respectively;
a first summing system configured to receive at least a first datum multiplied by a first integer;
a second summing system configured to receive at least a second datum multiplied by a second integer;
wherein the third datum is free from transmission to the first summing system and the second summing system.

17. The system of claim 16 wherein the plurality of shift registers is further configured to receive at least a fourth datum and a fifth datum respectively, the fourth datum multiplied by a third integer and transmitted to the first summing system, the fifth datum multiplied by a fourth integer and transmitted to the second summing system.

18. The system of claim 12 wherein the processing system is configured to estimate a cross correlation coefficient based on at least information associated with the correlation signal, and estimate a cross correlated power level based on at least information associated with the cross correlation coefficient, the first log-video signal, and the second log-video signal.

19. The system of claim 18 wherein at least a correlation signal comprises an in-phase correlation signal, a quadrature-phase correlation signal, and a normalization signal.

20. A method for detecting signals, the method comprising:
receiving a first input signal;
receiving a second input signal;
generating a first log-video signal, a second log-video signal, a first intermediate frequency signal, and a second intermediate frequency signal;
generating an in-phase correlation signal, a quadrature-phase correlation signal, and a normalization signal;
processing at least information associated with the in-phase correlation signal, the quadrature-phase correlation signal, the normalization signal, the first log-video signal, and the second log-video signal;
determining a cross correlated power level based on at least information associated with the in-phase correlation signal, the quadrature-phase correlation signal, the normalization signal, the first log-video signal, and the second log-video signal.

21. The method of claim 20 wherein the first log-video signal is associated with at least amplitude information of the first input signal, the second log-video signal is associated with at least amplitude information of the second input signal, the first intermediate frequency signal is associated with at least phase information of the first input signal, and the second intermediate frequency signal is associated with at least phase information of the second input signal.

22. The method of claim 20 wherein the generating an in-phase correlation signal, a quadrature-phase correlation signal, and a normalization signal comprises:
delaying the first intermediate frequency signal by a first time period;
down converting a frequency of the first intermediate frequency signal;
delaying the first down-converted intermediate frequency signal by a second time period.

23. The method of claim 22 wherein the generating an in-phase correlation signal, a quadrature-phase correlation signal, and a normalization signal further comprises:
delaying the second intermediate frequency signal by a third time period;
down converting a frequency of the second intermediate frequency signal;
delaying the second down-converted intermediate frequency signal by a fourth time period.

24. The method of claim 22 wherein the down converting a frequency of the first intermediate frequency signal comprises:
receiving at least a first datum, a second datum and a third datum;
multiplying the first datum and a second datum by a first integer and a second integer respectively;
transmitting the first multiplied datum and the second multiplied datum to a first summing system and a second summing system respectively;
wherein the third datum is free from transmission to the first summing system and the second summing system.

25. The method of claim 24 wherein the down converting a frequency of the first intermediate frequency signal further comprises:
receiving at least a third datum and a fourth datum;
multiplying the third datum and the fourth datum by a third integer and a fourth integer respectively;
transmitting the third multiplied datum and the fourth multiplied datum to the first summing system and the second summing system respectively;
summing at least the multiplied first datum and the third multiplied datum;
summing at least the multiplied second datum and the fourth multiplied datum.

26. The method of claim 20 wherein the determining a cross correlated power level comprises:
determining a cross correlation coefficient based on at least information associated with the in-phase correlation signal, the quadrature-phase correlation signal, and the normalization signal;
processing at least information associated with the cross correlation coefficient, the first log-video signal, and the second log-video signal;
determining a cross correlated power level based on at least information associated with the cross correlation coefficient, the first log-video signal, and the second log-video signal.

* * * * *